Inventor
RIVELIN E. RICHARDS

Inventor
RIVELIN E. RICHARDS

United States Patent Office 3,440,746
Patented Apr. 29, 1969

3,440,746
ASSEMBLY OF LETTERING AND THE LIKE
Rivelin E. Richards, Goldhanger House, Goldhanger, near Maldon, Essex, England
Filed June 28, 1966, Ser. No. 561,149
Claims priority, application Great Britain, July 1, 1965, 27,836/65
Int. Cl. G09f 7/00
U.S. Cl. 40—125                                                    1 Claim

ABSTRACT OF THE DISCLOSURE

A system is provided for displaying characters in a neat and orderly fashion and in properly spaced alignment for use in signs and displays in which the characters are flexible and are releasably adhered to a flexible rectangular mount and are positioned thereon laterally and vertically so that when the mounts are abutted and aligned the characters will be in properly spaced alignment. The mounts are removable from said characters so the latter can be adhered to a surface while maintaining the properly spaced alignment of the characters.

---

This invention relates to the manufacture of lettering, numerals, symbols and so forth to simplify spacing and alignment in the production of signs, number and name plates, and other display matter.

The object of the invention is to provide self-aligning lettering and so forth, in other words to ensure that the spacing between the characters, the words formed by the characters and the spacing between one line and another, are all correctly achieved.

The invention consists in producing a group of self-adhesive characters, each adhering to a mount, the size of the mounts being so proportioned in relation to the size of the particular characters, and the characters being so positioned on the mounts, that when one mount is butted up to and aligned with another, the proper spacing and alignment of a group of characters is automatically obtained so that the characters can be applied correctly to a base.

Figure 1:
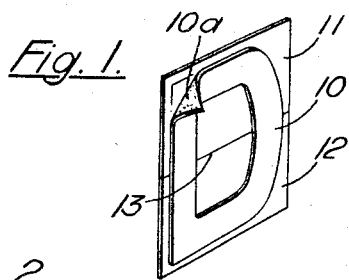
FIG. 1 is a perspective view of a character mounted on a backing.

Referring to FIG. 1 a character 10 (a capital D) is mounted on a backing which is formed in separate upper and lower portions 11, 12 with a horizontal division 13, from which each half of the backing can be separately removed from the character. The top left hand corner of the character is shown at 10a at the commencement of separation. The characters 10 may be made of any suitable material but a smooth highly opaque gloss finished white, black or colored vinyl film is particularly convenient coated with an adhesive which may be a pigmented hightack, pressure sensitive type based on acrylic resins. The backings, 11, 12 may also be of any suitable thin material to which the characters are self-adhesive, for instance paper, or a metallic or plastics film material.

Figure 2:
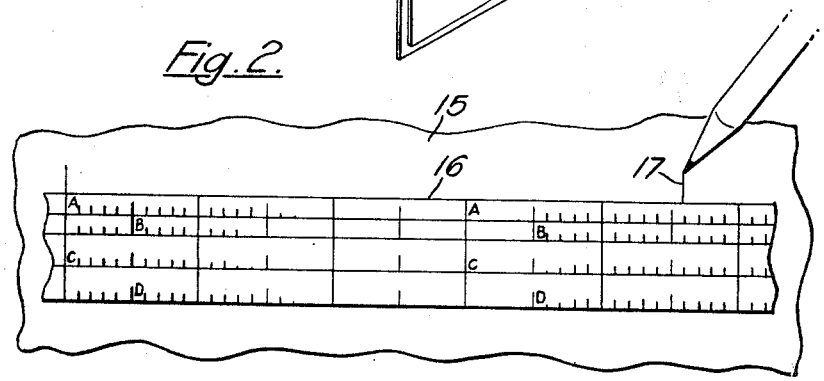
FIG. 2 is a plan showing a flat sheet to which characters are to be affixed and a gauge device in place upon it.

Referring to FIG. 2 a sheet to which the characters are to be affixed is shown at 15 and on it is laid a gauge member 16 which is of elongated rectangular shape: a portion only of this is shown for convenience in illustration. The gauge is marked off vertically in units of length, for example in inches and tenths of an inch, and also has horizontal lines for aligment of such characters as descend below the normal line of lettering, for example lower case letters g, p and q. The horizontal lines are identified by letters A, B, C, and D or other symbols corresponding with different sized characters used: obviously it is not essential to have four lines implying four different sizes of character; there may be more or fewer. It will be realized that the different characters will be on mounts of different widths, for instance M will be wider than I. It will be convenient to provide a table of widths of the different characters so that the user can readily ascertain the total widths of the backings to be used in a line of characters by measuring from the left-hand edge of the sheet and marking the starting position on the sheet, as suggested at 17 in FIG. 2.

Figure 3:
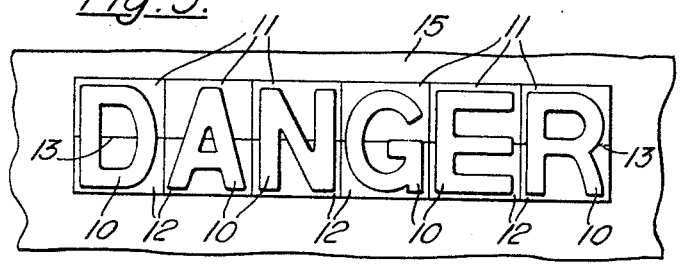
FIG. 3 shows a flat sheet with a group of characters laid out upon it to form a warning sign.

FIG. 3 shows a group of characters 10 with their backings 11, 12 and divisions 13 in place on a sheet 15 but not secured.

Figure 4:
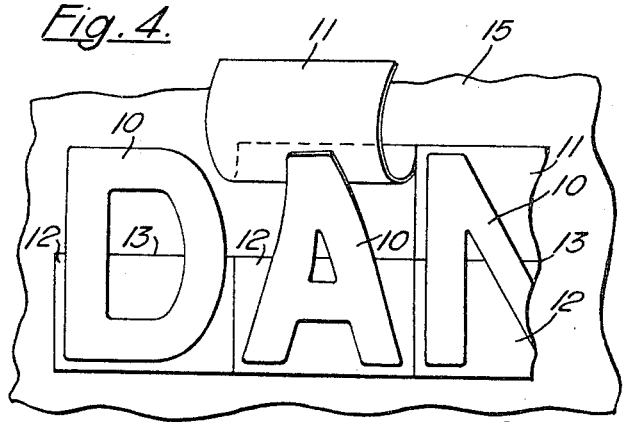
FIG. 4 is an enlarged view of part of the group shown in FIG. 3, illustrating one step in the affixing of the characters to the sheet.

FIG. 4 illustrates the first stage of the securing operation. The upper part 11 of the backing of the first character 10 (the letter D) has been peeled off and the upper part of the character has been pressed on to the sheet 15 to which it is adhering. The upper part 11 of the backing of the second character 10 (the letter A) is in process of being peeled off. The backing of the third character (the letter N) is still intact.

Figure 5:
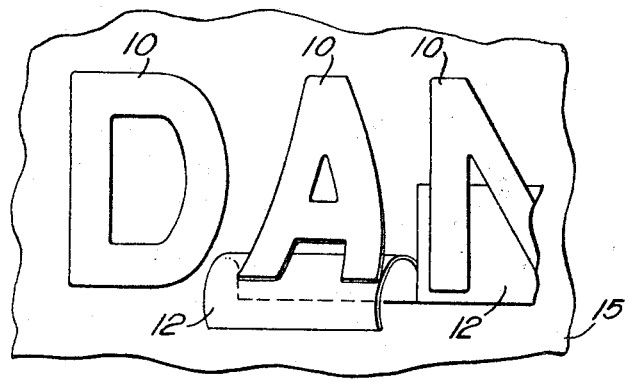
FIG. 5 is a similar view to FIG. 4 illustrating a further step in the affixing of the characters to the sheet.

FIG. 5 shows a further stage in the securing operation after all the upper parts 11 of the backings have been removed. The lower part 12 of the backing of the first character 10 (the letter D) has been peeled off and that character is now completely adhering to the sheet 15. The lower part 12 of the backing of the second character 10 (the letter A) is in process of being peeled off, after which that character also will be pressed down on to the sheet 15. After this the third character 10 (the letter N) will be similarly dealt with.

Figure 6:
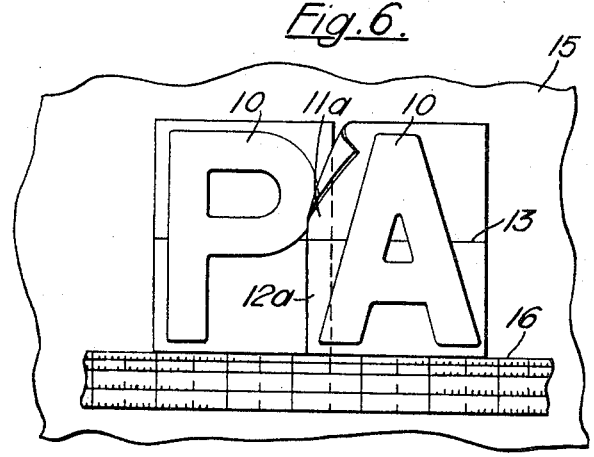
FIG. 6 is a similar view to FIG. 4 illustrating the use of the gauge device in spacing characters horizontally.

FIG. 6 illustrates an additional refinement in spacing. In an assembly such as that of FIGS. 3, 4, and 5, the backings on which the characters are mounted are simply butted up to each other edge to edge, that is to say the backing of one character has its bottom edge in line with the bottom edge of the preceding backing, and its left-hand edge butts up to the right-hand edge of the preceding backing.

This gives exact alignment and spacing of the characters; that is to say when the first character has its upper half affixed as in FIG. 4 the remaining characters are laid in place and similarly secured one by one, and the characters are automatically aligned because they are correctly positioned on their backings. In some cases, however, it will be better if certain characters are fitted closer together than the mere butting of the backings would denote. Thus, characters such as the capital P wider at the top than the bottom, and the capital A, wider at the bottom than the top, can very well be mounted closer together when P is followed by A than they would be mounted normally, by overlapping the backings as indicated at 11a, 12a FIG. 6.

Figure 7:
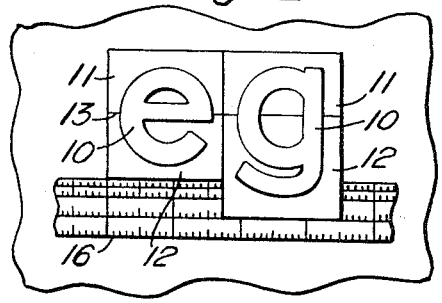
FIG. 7 is a similar view to FIG. 6 illustrating the use of the gauge in aligning characters both vertically and horizontally.

FIG. 7 shows the use of the gauge 16 to align characters 10 which depend below the normal level, for instance where lower case e is followed by lower case g; as illustrated the characters used corresponding in size with the third dimension contemplated by the line C of FIG. 2 and therefore having the bottom edge of the lower part 12 of the backing of the lower case g in line with the line C on the gauge, enables the selected group to be accurately positioned.

In some cases the mounts for the characters may be facings instead of backings, for instance if the characters are to be affixed to the back face of a transparent or translucent base.

The paper or other mount material is conveniently coated with a release agent such as silicone.

I claim:

A display system comprising a plurality of flexible characters having a coating of pressure sensitive adhesive thereon, a plurality of flexible rectangular mounts for said characters, each character being removable adhered to a mount in a position laterally and vertically thereon with respect to the edges thereof so that a plurality of mounts may be arranged on a surface in an abutting alignment to give the characters properly spaced alignment on said surface after removal of said mounts, each mount being divided into two parts, the division passing across the adhering character, so that one part of the mount may be peeled off and the character affixed in its position on the surface before the other part of the mount is removed.

References Cited

UNITED STATES PATENTS

| | | |
|---|---|---|
| 3,294,611 | 12/1966 | Vomela. |
| 3,312,563 | 4/1967 | Rusch _____ 40—135 X |
| 3,315,387 | 4/1967 | Neuser _____ 40—2 |

FOREIGN PATENTS

| | | |
|---|---|---|
| 238,852 | 1/1960 | Australia. |
| 450,950 | 4/1935 | Great Britain. |

EUGENE R. CAPOZIO, *Primary Examiner.*

RICHARD CARTER, *Assistant Examiner.*